(12) United States Patent
Wang et al.

(10) Patent No.: US 11,988,935 B2
(45) Date of Patent: May 21, 2024

(54) BUS BAR DESIGN OF AN IGU WITH GRADED TRANSMISSION STATE

(71) Applicant: SAGE ELECTROCHROMICS, INC., Faribault, MN (US)

(72) Inventors: Yigang Wang, Plymouth, MN (US); Bolei Di, Woodbury, MN (US); Jean-Christophe Giron, Edina, MN (US); Sebastian Marius Sarrach, Lakeville, MN (US); Ariane Weissler, Aachen (DE); Bryan D. Greer, Northfield, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 116 days.

(21) Appl. No.: 17/643,644

(22) Filed: Dec. 10, 2021

(65) Prior Publication Data

US 2022/0187670 A1 Jun. 16, 2022

Related U.S. Application Data

(60) Provisional application No. 63/125,712, filed on Dec. 15, 2020.

(51) Int. Cl.
*G02F 1/1343* (2006.01)
*G02F 1/153* (2006.01)
*G02F 1/155* (2006.01)

(52) U.S. Cl.
CPC ........ *G02F 1/1533* (2013.01); *G02F 1/13439* (2013.01); *G02F 1/155* (2013.01)

(58) Field of Classification Search
CPC ............. G02F 1/1343; G02F 1/134309; G02F 1/13439; G02F 1/163; G02F 1/1533; G02F 1/155
See application file for complete search history.

(56) References Cited

U.S. PATENT DOCUMENTS

| | | | |
|---|---|---|---|
| 4,923,289 A | 5/1990 | Demiryont | |
| 6,471,360 B2 | 10/2002 | Rukavina et al. | |
| 10,429,712 B2 | 10/2019 | Jack et al. | |
| 2014/0192393 A1 | 7/2014 | Bhatnagar et al. | |
| 2016/0251894 A1 | 9/2016 | Shrivastava et al. | |

(Continued)

FOREIGN PATENT DOCUMENTS

| | | |
|---|---|---|
| CN | 110609428 A | 12/2019 |
| TW | 201830115 A | 8/2018 |
| WO | 2014078429 A1 | 5/2014 |

OTHER PUBLICATIONS

International Search Report from PCT Application No. PCT/US2021/072848 dated Apr. 8, 2022, 1 pg.

*Primary Examiner* — Thoi V Duong
(74) *Attorney, Agent, or Firm* — Abel Schillinger, LLP; Robert N Young

(57) ABSTRACT

An electrochromic apparatus is disclosed. The electrochromic device can include a first bus bar electrically connected to a first transparent conductor, where the first bus bar comprises a first segment between a second segment and a third segment, where the first segment has a first thickness that is less than a second thickness of the second segment and less than a third thickness of the third segment. The electrochromic apparatus can further include a first voltage supply terminal that is offset from a center of the first bus bar.

12 Claims, 9 Drawing Sheets

(56) References Cited

U.S. PATENT DOCUMENTS

| | | |
|---|---|---|
| 2018/0196323 A1 | 7/2018 | Wang et al. |
| 2019/0094643 A1 | 3/2019 | Friedman et al. |
| 2019/0169926 A1 | 6/2019 | Shrivastava et al. |
| 2020/0272015 A1 | 8/2020 | Wang |
| 2023/0004057 A1* | 1/2023 | Jack ........................ G02F 1/155 |

* cited by examiner

BUS BAR DESIGN OF AN IGU WITH GRADED TRANSMISSION STATE

CROSS-REFERENCE TO RELATED APPLICATION(S)

This application claims priority under 35 U.S.C. § 119(e) to U.S. Patent Application No. 63/125,712, entitled "BUS BAR DESIGN OF AN IGU WITH GRADED TRANSMISSION STATE," by Yigang WANG et al., filed Dec. 15, 2020, which is assigned to the current assignee hereof and incorporated herein by reference in its entirety.

BACKGROUND

The present disclosure is directed to electroactive devices, and more specifically to apparatuses including electrochromic devices and method of using the same.

An electrochromic device can reduce the amount of sunlight entering a room or passenger compartment of a vehicle. Conventionally, an electrochromic device can be at a particular transmission state. For example, the electrochromic device may be set to a certain tint level (i.e. a percentage of light transmission through the electrochromic device), such as full tint (e.g. 0% transmission level), full clear (e.g. 63%+/−10% transmission level), or some tint level (or transmission level) in between the two. A glass pane may be formed with different discrete electrochromic devices, each controlled by its own pair of bus bars. The different electrochromic devices can each be set to a different tint level (i.e. % transmission state level). However, voltage profiles in an IGU can vary based on the size, shape and resistance across a given configuration. Further improvement in control regarding tinting of an electrochromic device is desired.

BRIEF DESCRIPTION OF THE DRAWINGS

Embodiments are illustrated by way of example and are not limited in the accompanying figures.

Figure 1:
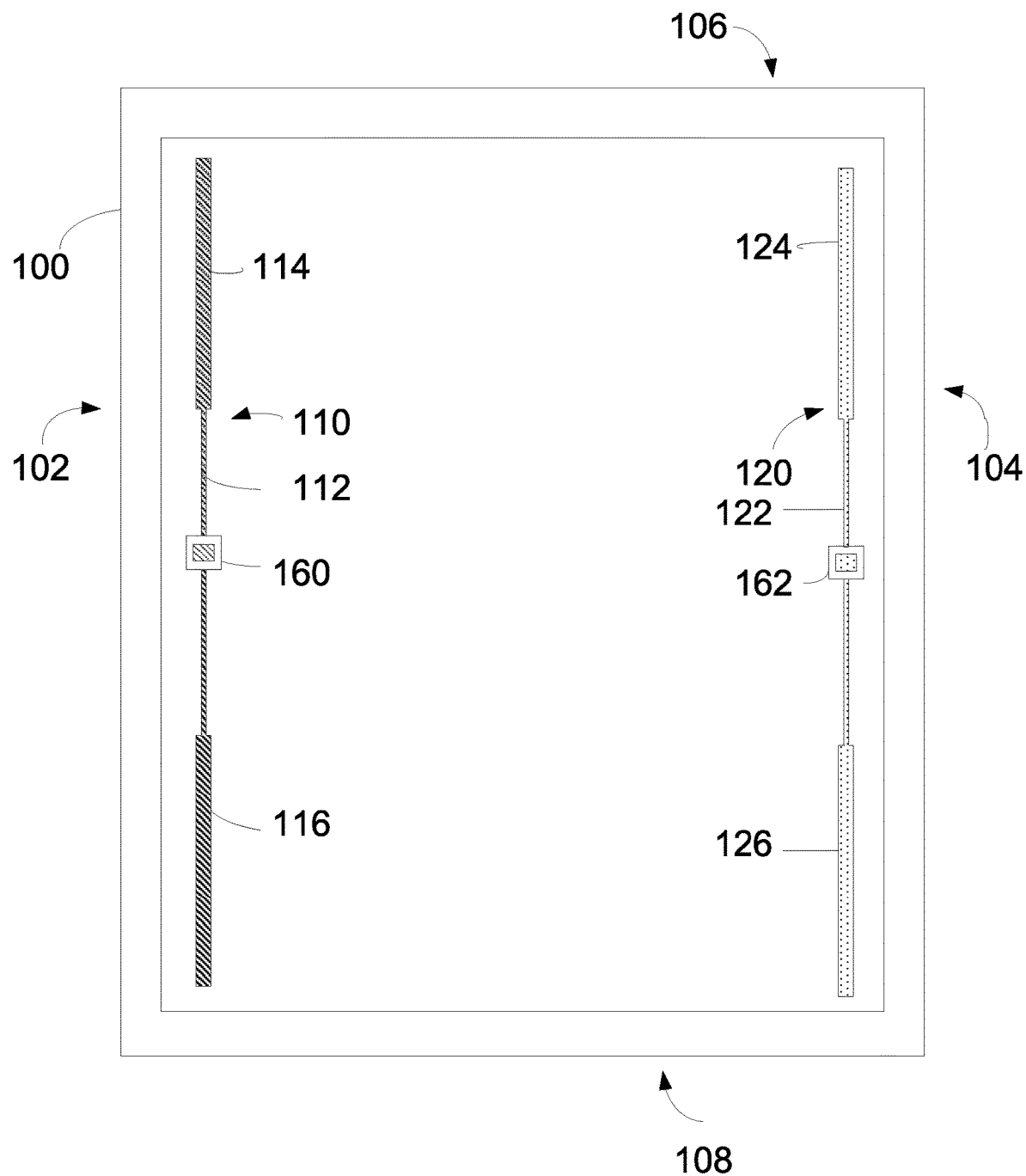
FIG. 1 includes an illustration of a top view of the substrate, a stack of layers of an electrochromic device, and bus bars, according to one embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

When referring to variables, the term "steady state" is intended to mean that an operating variable is substantially constant when averaged over 10 seconds, even through the operating variable may be change during a transient state. For example, when in steady state, an operating variable may be maintained within 10%, within 5%, or within 0.9% of an average for the operating variable for a particular mode of operation for a particular device. Variations may be due to imperfections in an apparatus or supporting equipment, such as noise transmitted along voltage lines, switching transistors within a control device, operating other components within an apparatus, or other similar effects. Still further, a variable may be changed for a microsecond each second, so that a variable, such as voltage or current, may be read; or one or more of the voltage supply terminals may alternate between two different voltages (e.g., V1 and V2) at a frequency of 1 Hz or greater. Thus, an apparatus may be at steady state even with such variations due to imperfections or when reading operating parameters. When changing between modes of operation, one or more of the operating variables may be in a transient state. Examples of such variables can include voltages at particular locations within an electrochromic device or current flowing through the electrochromic device.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

An electrochromic device can be maintained in a continuously graded transmission state for nearly any time period, for example, such as beyond the time needed for switching between states. When continuously graded, the electrochromic device can have a relatively higher electrical field between bus bars at an area with relatively less transmission and a relatively lower electrical field between the bus bars at another area with relative greater transmission. The continuous grading allows for a more visibly pleasing transition between less transmission to greater transmission, as compared to discrete grading. The varying locations of the bus bars can provide voltages that can range from fully clear (highest transmission or fully bleached) to fully tinted (lowest transmission state), or anything in between. Still further, the electrochromic device can be operated with a substantially uniform transmission state across all of the area of the electrochromic device, with a continuously graded transmission state across all of the area of the electrochromic device, or with a combination of a portion with a substantially uniform transmission state and another portion with a continuously graded transmission state.

Many different patterns for the continuously graded transmission state can be achieved by the proper selection of bus bar location, the number of voltage supply terminals coupled to each bus bar, locations of voltage supply terminals along the bus bars, or any combination thereof. In another embodiment, gaps between bus bars can be used to achieve a continuously graded transmission state.

The electrochromic device can be used as part of a window for a building or a vehicle or other applications that can benefit from a controllable tinting, such as partitions that separate living spaces or office spaces. The electrochromic device can be used within an apparatus. The apparatus can further include an energy source, an input/output unit, and a control device that controls the electrochromic device. Components within the apparatus may be located near or remotely from the electrochromic device. In an embodiment, one or more of such components may be integrated with environmental controls within a building.

An electrochromic device can operate with voltages on bus bars being in a range of 0 V to 50 V. In one embodiment, the voltages can be between 0 V and 25 V. In another embodiment, the voltages can be between 0 V and 10 V. In yet another embodiment, the voltages can be between 0 V and 3 V. Such description is used to simplify concepts as described herein. Other voltages may be used with the electrochromic device, such as if the composition or thicknesses of layers within an electrochromic stack are changed. The voltages on bus bars may both be positive (0.1 V to 50 V), both negative (−50 V to −0.1 V), or a combination of negative and positive voltages (−1 V to 2 V), as the voltage difference between bus bars are more important than the actual voltages. Furthermore, the voltage difference between the bus bars may be less than or greater than 50 V. Embodiments described herein are exemplary and not intended to limit the scope of the appended claims.

When controlling the tint profile of an electrochromic device (ECD) in an insulated glass unit (IGU), a voltage profile can be applied to the bus bars of the ECD to produce a desired tint level. Multiple voltage profiles can be determined that produce respective desired tint profiles in the ECD. Therefore, when a first set voltage profile (SVP) is applied to the bus bars, the ECD produces a first desired tint profile (DTP) and when a second SVP is applied to the bus bars, the ECD produces a second DTP. A DTP represents the tinting across an ECD that produces a desired light transmission profile across the ECD of the IGU. Each one of multiple DTPs can be fully clear (highest transmission or fully bleached) to fully tinted (lowest transmission state), or anything in between. The DTP can also be a substantially uniform transmission state across all of the area of the ECD, a continuously graded transmission state across all of the area of the ECD, or with a combination of a portion with a substantially uniform transmission state and another portion with a continuously graded transmission state.

FIG. 1 includes an illustration of a top view of a substrate 100, a stack of layers of an electrochromic device, and bus bars, according to one embodiment. A first bus bar 110 may be along a first side 102 of the substrate 100, and a second bus bar 120 can be along a second side 104 that is opposite the first side 102. In one embodiment, the first side 102 is generally parallel to the second side 104. In one embodiment, the substrate 100 can include a third side 106 generally orthogonal to the first side 102. In another embodiment, the substrate 100 can include a fourth side 108 opposite the third side 106 and generally parallel to the third side 106. Each of the bus bars 110 and 120 have lengths that extend a majority of the distance between the third side 106 and the fourth side 108 that is opposite the third side 106.

In one embodiment, the first bus bar 110 and the second bus bar 120 are generally parallel each other. As used herein, substantially parallel is intended to mean that the two bus bars can be within 10 degrees of each other, such as within 5 degrees of each other, such as within 4 degrees of each other, such as within 2 degrees of each other, or such as within 1 degree of each other. As will be discuss in more detail below with respect to FIG. 5, the first bus bar 110 can be electrically connected to a first transparent conductive layer while the second bus bar 120 can be connected to a second transparent conductive layer. In one embodiment, the first bus bar 110 can have at least two different thicknesses. In one embodiment, the first bus bar 110 can have a first thickness and a second thickness where the first thickness is less than the second thickness. The first bus bar 110 can have more than one segment. In one embodiment, the first bus bar 110 can have at least three segments, where a first segment 112 is between the second segment 114 and the third segment 116, and where the first segment 112 has a first thickness, the second segment 114 has a second segment, and the third segment 116 has a third segment. The first thickness can be less than the second thickness. The second thickness can be substantially the same as the third thickness. In one embodiment, the third thickness is greater than the first thickness. In one embodiment, the first thickness can be between one-half and one-third the thickness of the second thickness. In other words, the ratio of the first thickness to the second thickness can be between 1:10 and 1:2. In one embodiment, the ratio of the first thickness to the second thickness and the third thickness can be between 1:10:10 and 1:2:2.

In one embodiment, the second bus bar 120 can have at least two different thicknesses. In one embodiment, the second bus bar 120 can have a first thickness and a second thickness where the first thickness is less than the second thickness. The second bus bar 120 can have more than one segment. In one embodiment, the second bus bar 120 can have at least three segments, where a first segment 122 is between the second segment 124 and the third segment 126, and where the first segment 122 has a first thickness, the second segment 124 has a second thickness, and the third segment 126 has a third thickness. The first thickness can be less than the second thickness. The second thickness can be substantially the same as the third thickness. In one embodiment, the third thickness is greater than the first thickness. In one embodiment, the first thickness can be between one-half and one-third the thickness of the second thickness. In other words, the ratio of the first thickness to the second thickness can be between 1:10 and 1:2. In one embodiment, the ratio of the first thickness to the second thickness and the third thickness can be between 1:10:10 and 1:2:2. In one embodiment, the first bus bar 110 and the second bus bar 120 can have varying thicknesses. As the thickness varies so too does the amount of power across the entire length of the bus bar. In one embodiment, while more power is supplied to the thinner segment, the thicker segment can be substantially more efficient and require less power. In other words, the resistance across the length of the first bus bar can eliminate the need for an isolation scribe without shorting out the electrochromic device.

In one embodiment, the first bus bar 110 can be connected to a first voltage supply terminal 160 and the second bus bar 120 can be connected to a second voltage supply terminal 162. In one embodiment, the voltage supply terminals can be connected to each bus bar 110 and 120 about the center of each bus bar. In another embodiment, the first voltage supply terminal 160 can be connected to the first segment 112 of the first bus bar 110. In another embodiment, the second voltage supply terminal 162 can be connected to the first segment 132 of the second bus bar 120. The ability to control each voltage supply terminal 160 and 162 provide for control over grading of light transmission through the electrochromic device 124.

In one embodiment, the first voltage supply terminal 160 can set the voltage for the first bus bar 110 at a value within about 0.5 V, such as 0.4 V, such as 0.3 V, such as 0.2 V, such as 0.1 V to the voltage set by the voltage supply terminal 162 for the second bus bar 120. In a non-limiting example, the first voltage supply terminal 160 can set the voltage for the first bus bar 110 at 0 V, the second voltage supply terminal 162 can set the voltage for the second bus bar 120 at 3V. Since the resistance within the first segment 112 of the first bus bar 110 and the first segment 122 of the second bus bar 120 can be higher than other segments of the first bus bar 110 and the second bus bar 122, the power requirement for the first segment 112 and the first segment 122 of the second bus bar 120 can be greater than the other segments of the first bus bar 110 and the second bus bar 120. As a voltage potential between bus bars 110 and 120 can cause current to flow through the top transparent conductive layer and the bottom transparent conductive layer to alter the tint profile to a continuously graded transmission.

Figure 2A:
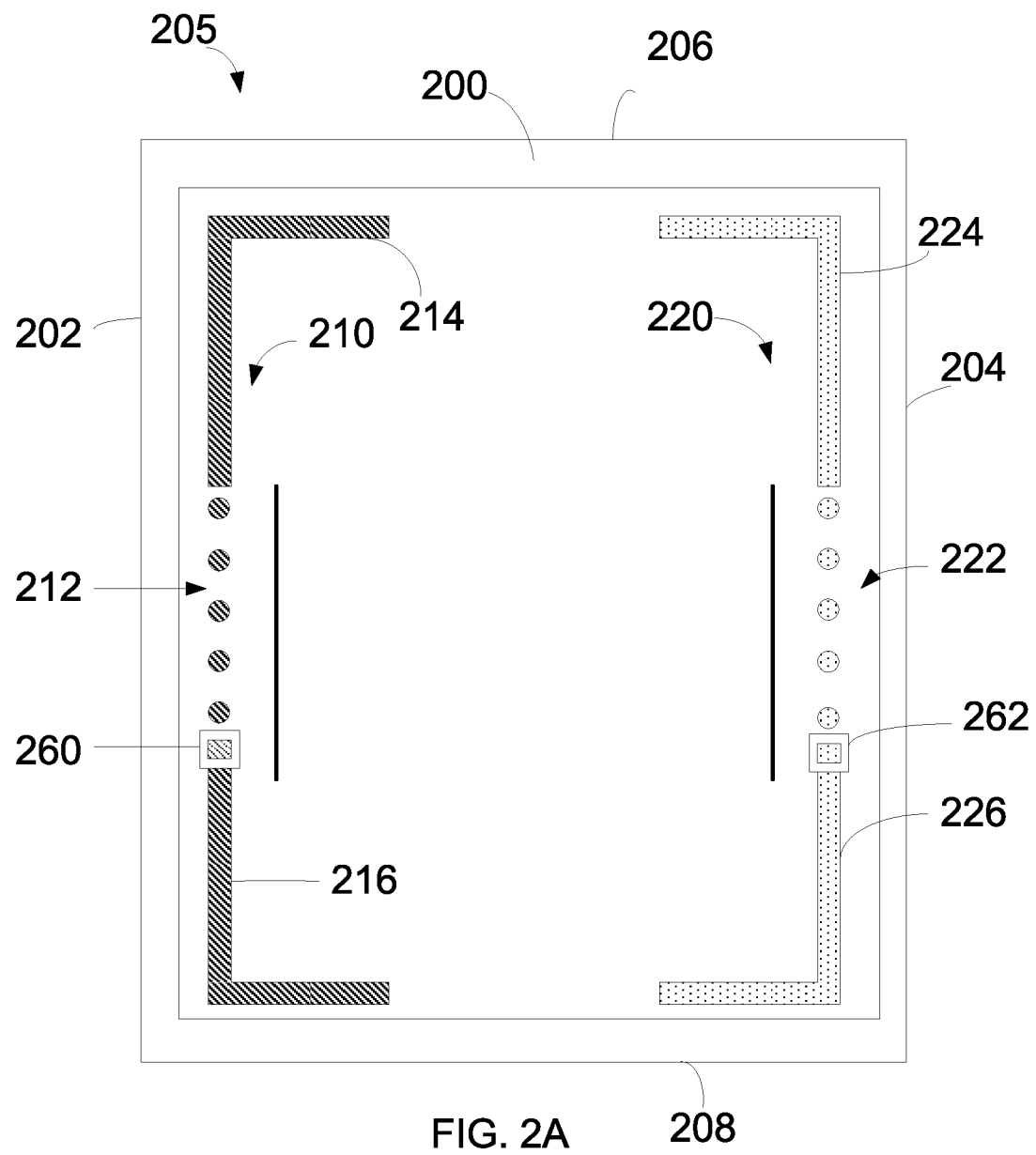
FIGS. 2A-2C each includes an illustration of a top view of the substrate, a stack of layers of an electrochromic device, and bus bars, according to another embodiment.
Figure 2B:
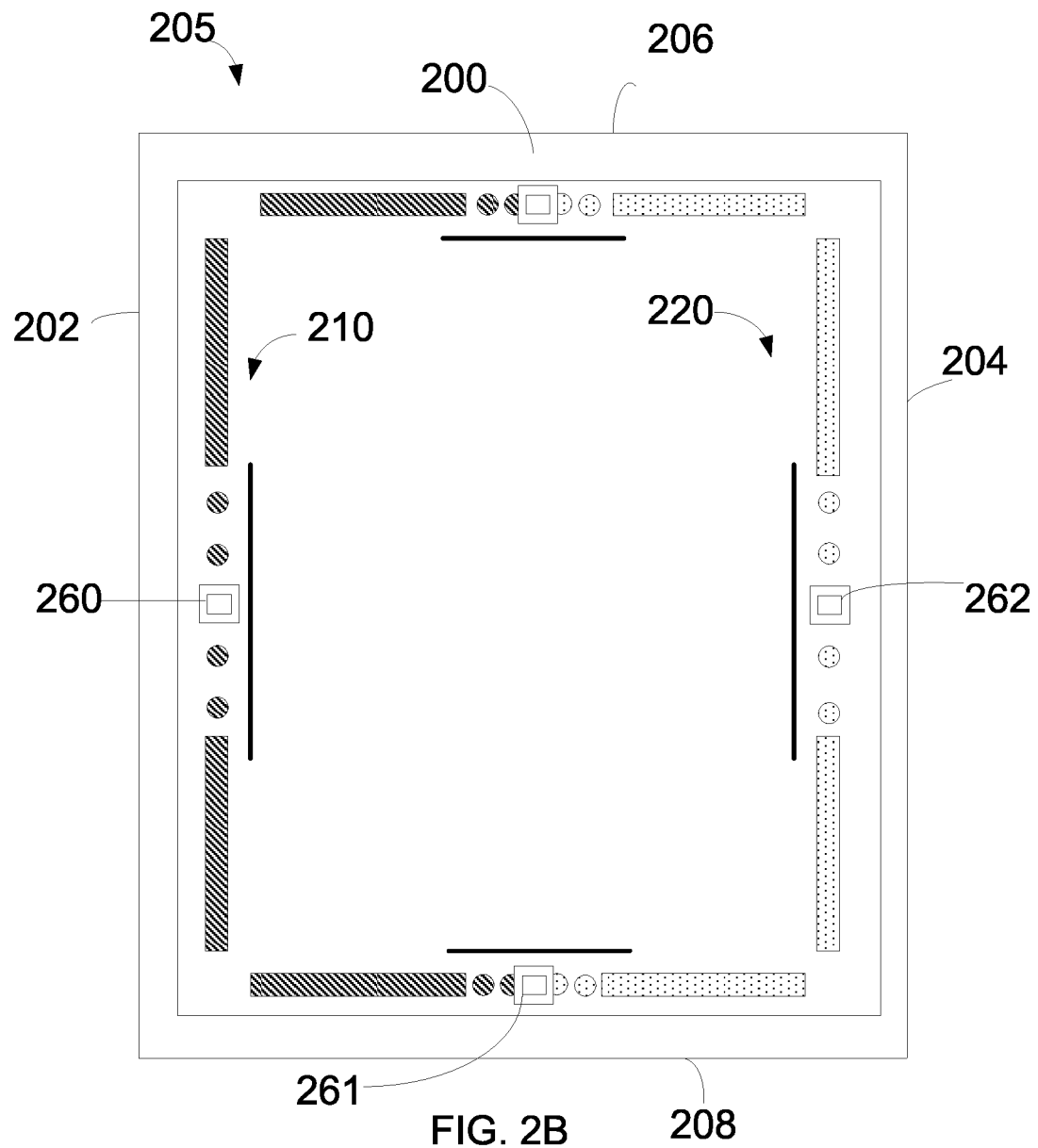
Figure 2C:
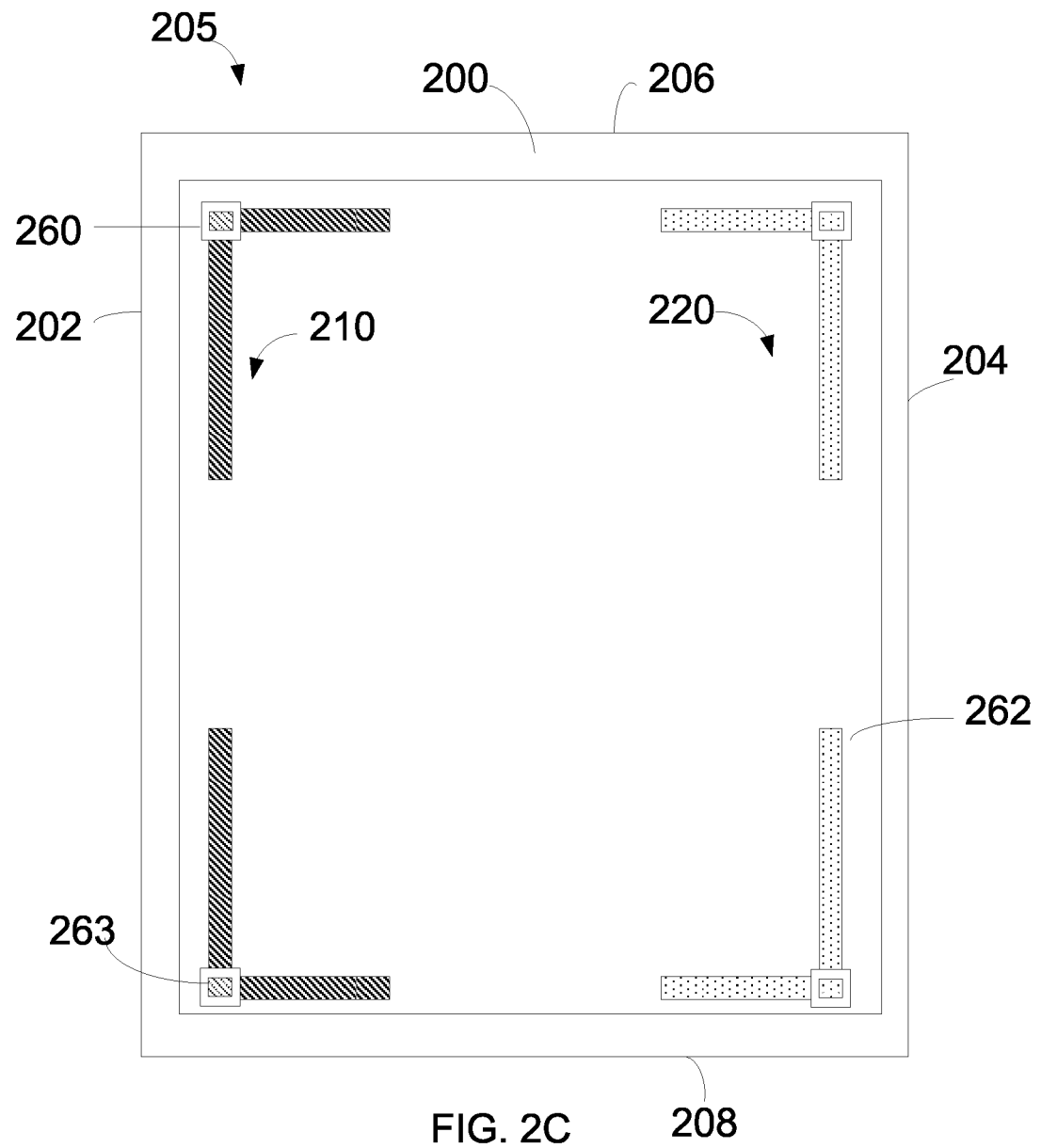

FIGS. 2A-2C each includes an illustration of a top view of the substrate, a stack of layers of an electrochromic device, and bus bars, according to another embodiment. The electrochromic device 205 can include a substrate 200, a first bus bar 210, and a second bus bar 220. In the embodiment of FIG. 2A, the first bus bar 210 may be along a first side 202 of the substrate 200, and a second bus bar 220 can be along a second side 204 that is opposite the first side 202. In one embodiment, the first bus bar 210 can be along the first side 202, a third side 206 of the substrate 200, and a fourth side 208 of the substrate 200. In one embodiment, the second bus bar 220 can be along the second side 204, the third side 206, and the fourth side 208. In one embodiment, the first side 202 is generally parallel to the second side 204. In one embodiment, the third side 206 is generally orthogonal to the first side 202. In another embodiment, the fourth side 208 is opposite the third side 206 and generally parallel to the third side 206. Each of the bus bars 210 and 220 have lengths that extend a majority of the distance between the third side 206 and the fourth side 208 that is opposite the third side 206.

In another embodiment, the first bus bar 210 can have more than one segment. In one embodiment, the first bus bar 210 can have at least three segments, where a first segment 212 is between the second segment 214 and the third segment 216. In one embodiment, the first segment 212 can be a first shape and the second segment 214 can be a second shape. In one embodiment, the first segment 212 can be discontinuous and the second segment 214 can be continuous. In another embodiment, the first segment 214 can be discontinuous and the third segment 216 can be continuous. In one embodiment, the second segment 214 can be along both the first side 202 and the third side 206. In another embodiment, the third segment 216 can be along both the first side 202 and the fourth side 208.

In one embodiment, the first bus bar 210 can have at least two different thicknesses. In one embodiment, the first bus bar 210 can have a first thickness and a second thickness where the first thickness is less than the second thickness. In one embodiment, the first bus bar 210 can have two different shapes. In one embodiment, the first shape can be a square, rectangle, circle, triangle, dot, series of dots, pentagon, octagon, parallelogram, or other geometric shape. In one embodiment, the second shape can be a square, rectangle, circle, triangle, dot, series of dots, pentagon, octagon, parallelogram, or other geometric shape.

The first segment 212 can have a first thickness, the second segment 214 can have a second thickness, and the third segment 216 can have a third thickness. The first thickness can be less than the second thickness. The second thickness can be substantially the same as the third thickness. In one embodiment, the third thickness is greater than the first thickness. In one embodiment, the first thickness can be between one-half and one-third the thickness of the second thickness. In other words, the ratio of the first thickness to the second thickness can be between 1:10 and 1:2. In one embodiment, the ratio of the first thickness to the second thickness and the third thickness can be between 1:10:10 and 1:2:2.

The first bus bar 210 can have a major length that extends along the first side 202 and at least one minor length that extends along the third side 206. In one embodiment, the minor length extends along the fourth side 208. In another embodiment, a major length that extends along the first side 202, a first minor length extends along the third side 206, and a second minor length extends along the fourth side 208. In one embodiment, the at least one minor length is less than the major length. In another embodiment, the first minor length is about the same as the second minor length. In one embodiment, the major length of the first bus bar 210 and the major length of the second bus bar 220 are generally parallel each other. As used herein, substantially parallel is intended to mean that the two bus bars can be within 10 degrees of each other, such as within 5 degrees of each other, such as within 4 degrees of each other, such as within 2 degrees of each other, or such as within 1 degree of each other. As will be discuss in more detail below with respect to FIG. 5, the first bus bar 210 can be electrically connected to a first transparent conductive layer while the second bus bar 220 can be electrically connected to a second transparent conductive layer.

In one embodiment, the second bus bar 220 can have more than one segment. In one embodiment, the second bus bar 220 can have at least three segments, where a first segment 222 is between the second segment 224 and the third segment 226. In one embodiment, the first segment 222 can be a first shape and the second segment 224 can be a second shape. In one embodiment, the first segment 222 can be discontinuous and the second segment 224 can be continuous. In another embodiment, the first segment 224 can be discontinuous and the third segment 226 can be continuous. In one embodiment, the second segment 224 can be along both the second side 204 and the third side 206. In another embodiment, the third segment 226 can be along both the second side 204 and the fourth side 208.

In one embodiment, the second bus bar 220 can have at least two different thicknesses. In one embodiment, the first bus bar 220 can have a first thickness and a second thickness where the first thickness is less than the second thickness. In one embodiment, the second bus bar 220 can have two different shapes. In one embodiment, the first shape can be a square, rectangle, circle, triangle, dot, series of dots, pentagon, octagon, parallelogram, or other geometric shape. In one embodiment, the second shape can be a square, rectangle, circle, triangle, dot, series of dots, pentagon, octagon, parallelogram, or other geometric shape.

The first segment 222 can have a first thickness, the second segment 224 can have a second thickness, and the third segment 226 can have a third thickness. The first thickness can be less than the second thickness. The second thickness can be substantially the same as the third thickness. In one embodiment, the third thickness is greater than the first thickness. In one embodiment, the first thickness can be between one-half and one-third the thickness of the second thickness. In other words, the ratio of the first thickness to the second thickness can be between 1:10 and 1:2. In one embodiment, the ratio of the first thickness to the second thickness and the third thickness can be between 1:10:10 and 1:2:2.

The second bus bar 220 can have a major length that extends along the second side 204 and at least one minor length that extends along the third side 206. In one embodiment, the bus bars can extend around the corners. In another embodiment, as seen in FIG. 2B, the bus bars can extend adjacent the corners but not in the corners. As seen in FIG. 2B, the major length can include multiple segments of the bus bar. In one embodiment, the minor length extends along the fourth side 208. In another embodiment, a major length that extends along the second side 204, a first minor length extends along the third side 206, and a second minor length extends along the fourth side 208. In one embodiment, the at least one minor length is less than the major length. In another embodiment, the first minor length is about the same as the second minor length.

In one embodiment, the first bus bar 210 can be connected to a first voltage supply terminal 260 and the second bus bar 220 can be connected to a second voltage supply terminal 262. In another embodiment, as seen in FIG. 2B, the first bus bar 210 can have a major length connected to a first voltage supply terminal 260 and a minor length connected to a second voltage supply terminal 261. In one embodiment, the first voltage supply terminal 260 can be connected to a single bus bar while the second voltage supply terminal 261 can be connected to the first bus bar 210 and the second bus bar 220. In another embodiment, the device 205 can have four voltage supply terminals, where two terminals are each connected to a single bus bar and two voltage supply terminals are connected to two different bus bars. In another embodiment, as seen in FIG. 2C, the device 205 can have four voltage supply terminals, where each terminal is connected to the same bus bar. In one embodiment, the four voltage supply terminals can be located near each corner of the device 205. In one embodiment, a first voltage supply terminal 260 can be on adjacent the first side 202 and a second voltage supply terminal 263 can be adjacent the first side 202 with each terminal being connected to different segments of the same bus bar 210.

In another embodiment, the voltage supply terminals are connected to multiple segments of the same bus bar. In one embodiment, the first voltage supply terminal 260 can be connected to the third segment 216. In another embodiment, the first voltage supply terminal 260 can be connected to the second segment 214. In one embodiment, the first voltage supply terminal 260 can be electrically connected to and control the first segment 212, the second segment 214, and the third segment 216. In one embodiment, the first voltage supply terminal 260 can be along offset from a center of the major length of the first bus bar 210. In one embodiment, the first voltage supply terminal 260 can be along between 55% and 95% the major length of the first bus bar 210. In one embodiment, the first voltage supply terminal 260 is closer to the fourth side 208 of the substrate 200 than the third side 206 of the substrate 200. In another embodiment, the first voltage supply terminal 260 is closer to the third side 206 of the substrate 200 than the fourth side 208 of the substrate 200.

In one embodiment, the second voltage supply terminal 262 can be connected to the second segment 224. In another embodiment, the second voltage supply terminal 262 can be connected to the third segment 226. In one embodiment, the first voltage supply terminal 260 can be electrically connected to and controls the first segment 222, second segment 224, and third segment 226. In one embodiment, the second voltage supply terminal 262 can be along offset from a center of the major length of the second bus bar 220. In one embodiment, the second voltage supply terminal 262 can be along between 55% and 95% the major length of the second bus bar 220. In one embodiment, the second voltage supply terminal 262 is closer to the fourth side 208 of the substrate 200 than the third side 206 of the substrate 200. In another embodiment, the second voltage supply terminal 262 is closer to the third side 206 of the substrate 200 than the fourth side 208 of the substrate 200. Each voltage supply terminal 260 and 262 provide for control over grading of light transmission through the electrochromic device 205.

In one embodiment, the first voltage supply terminal 260 can set the voltage for the first bus bar 210 at a value within about 0.5 V, such as 0.4 V, such as 0.3 V, such as 0.2 V, such as 0.1 V to the voltage set by the voltage supply terminal 262 for the second bus bar 220. In a non-limiting example, the first voltage supply terminal 260 can set the voltage for the first bus bar 210 at 0 V, the second voltage supply terminal 262 can set the voltage for the second bus bar 220 at 3 V. Since the resistance within the first segment 212 of the first bus bar 210 and the first segment 222 of the second bus bar 220 can be higher than other segments of the first bus bar 210 and the second bus bar 222, the power requirement for the first segment 212 and the first segment 222 of the second bus bar 220 can be greater than the other segments of the first bus bar 210 and the second bus bar 220. As a voltage potential between bus bars 210 and 220 can cause current to flow through the top transparent conductive layer and the bottom transparent conductive layer to alter the tint profile to a continuously graded transmission. Additionally, since the voltage supply terminals are offset along the major lengths of each bus bar, the resistance is varies along the length of each bus bar thereby providing for current to flow through the top transparent conductive layer and the bottom transparent conductive layer to alter the tint profile to a continuously graded transmission.

Figure 3:
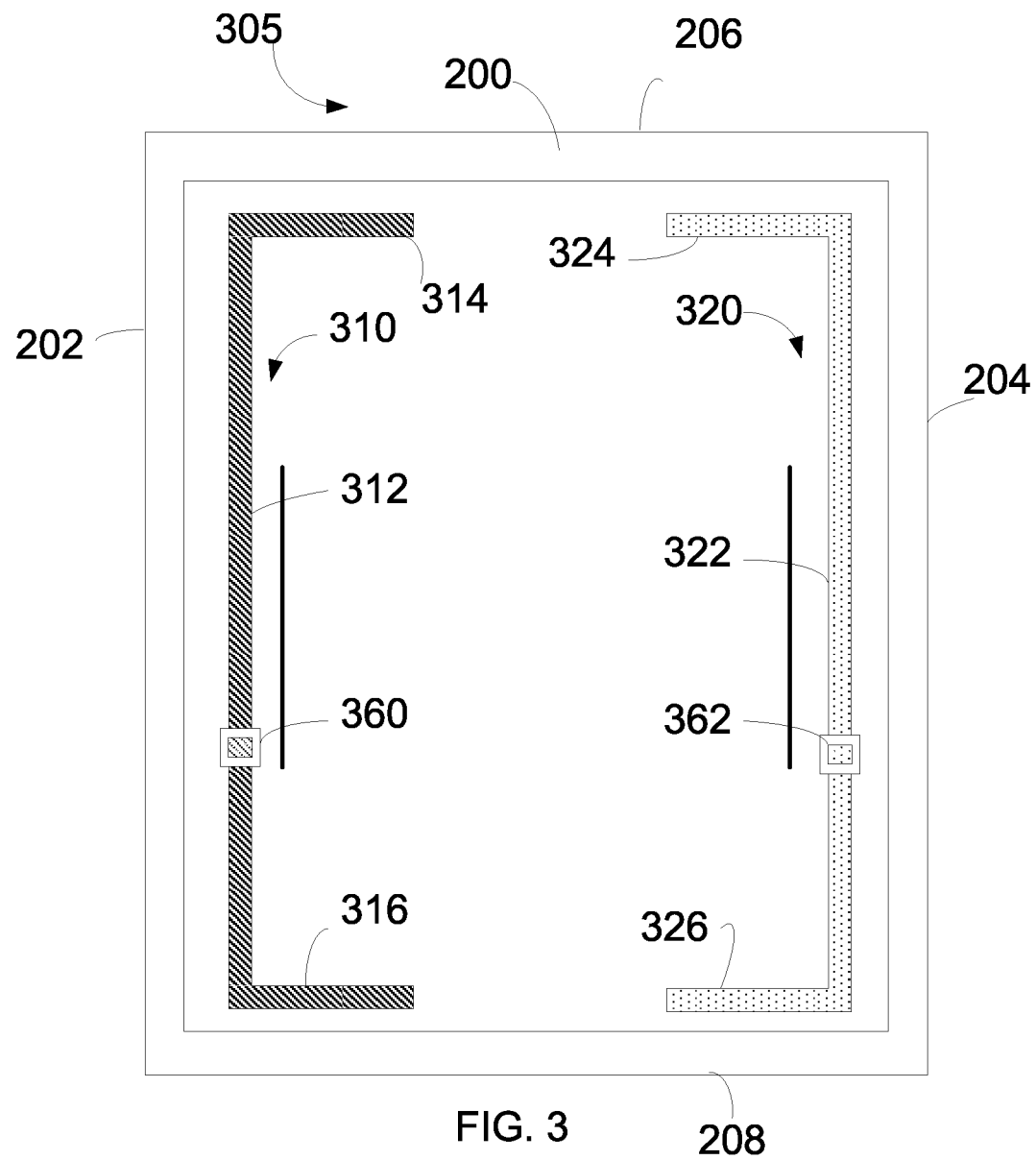
FIG. 3 includes an illustration of a top view of the substrate, a stack of layers of an electrochromic device, and bus bars, according to another embodiment.

FIG. 3 illustrates includes an illustration of a top view of a substrate, a stack of layers of an electrochromic device, and bus bars, according to another embodiment. The electrochromic device 305 of FIG. 3 is substantially similar to the electrochromic device 205 of FIG. 2. In fact, the electrochromic device 305 of FIG. 3 is a variant of the first embodiment of FIG. 2, in which equivalent elements have been given identical reference numbers. As such, only additional features or differences from FIG. 2 are described below.

As seen in FIG. 3, a first bus bar 310 with a first segment 312, a second segment 314, and a third segment 316, a second bus bar 320 with a first segment 322, a second segment 324, and a third segment 326, a first voltage supply terminal 360 connected to the first bus bar 310, and a second voltage supply terminal 363 connected to the second bus bar 320. In one embodiment, the first segment 312 of the first bus bar 310 can extend along the first side 202 of the substrate 200 and the first segment 322 of the second bus bar 322 can extend along the second side 204 of the substrate 200. In one embodiment, the second segment 314 of the of the first bus bar 310 can extend along the third side 206 of the substrate 200 and the second segment 324 of the second bus bar 322 can extend along the third side 206 of the substrate 200. In one embodiment, the third segment 316 of the of the first bus bar 310 can extend along the fourth side 208 of the substrate 200 and the second segment 326 of the second bus bar 322 can extend along the fourth side 208 of the substrate 200. In one embodiment, the first segment 312, the second segment 314, and the third segment 316 of the first bus bar 310 can be continuous. In one embodiment, the first segment 322, the second segment 324, and the third segment 326 of the second bus bar 320 can be continuous.

In one embodiment, the first segment 312 of the first bus bar 310 can have a length that is greater than a length of the third segment 316 of the first bus bar 310. In another embodiment, the first segment 312 of the first bus bar 310 can have a length that is greater than a length of the second segment 314 of the first bus bar 310. In one embodiment, the first segment 322 of the second bus bar 320 can have a length that is greater than a length of the third segment 326 of the second bus bar 320. In another embodiment, the first segment 322 of the second bus bar 320 can have a length that is greater than a length of the second segment 324 of the second bus bar 320.

The first voltage supply terminal 360 can be connected to the first bus bar 310. In one embodiment, the first voltage supply terminal 360 can be along the length of the first segment 312 of the first bus bar 310. In one embodiment, the first voltage supply terminal 360 can be along the first segment 312. In another embodiment, first voltage supply terminal 360 can be offset from a center of the first segment 312 of the first bus bar 310. In one embodiment, the first voltage supply terminal can be along between 55% and 95% the length of the first segment 312 of the first bus bar 310. The second voltage supply terminal 362 can be connected to the second bus bar 320. In one embodiment, the second voltage supply terminal 362 can be along the length of the first segment 322 of the second bus bar 320. In one embodiment, the second voltage supply terminal 362 can be along the first segment 322. In another embodiment, second voltage supply terminal 362 can be offset from a center of the first segment 322 of the second bus bar 320. In one embodiment, the second voltage supply terminal can be along between 55% and 95% the length of the first segment 322 of the second bus bar 320.

As a voltage potential between bus bars 310 and 320 can cause current to flow through the top transparent conductive layer and the bottom transparent conductive layer to alter the tint profile to a continuously graded transmission. Additionally, since the voltage supply terminals are offset along the major lengths of each bus bar, the resistance is varies along the length of each bus bar thereby providing for current to flow through the top transparent conductive layer and the bottom transparent conductive layer to alter the tint profile to a continuously graded transmission.

Figure 4A:
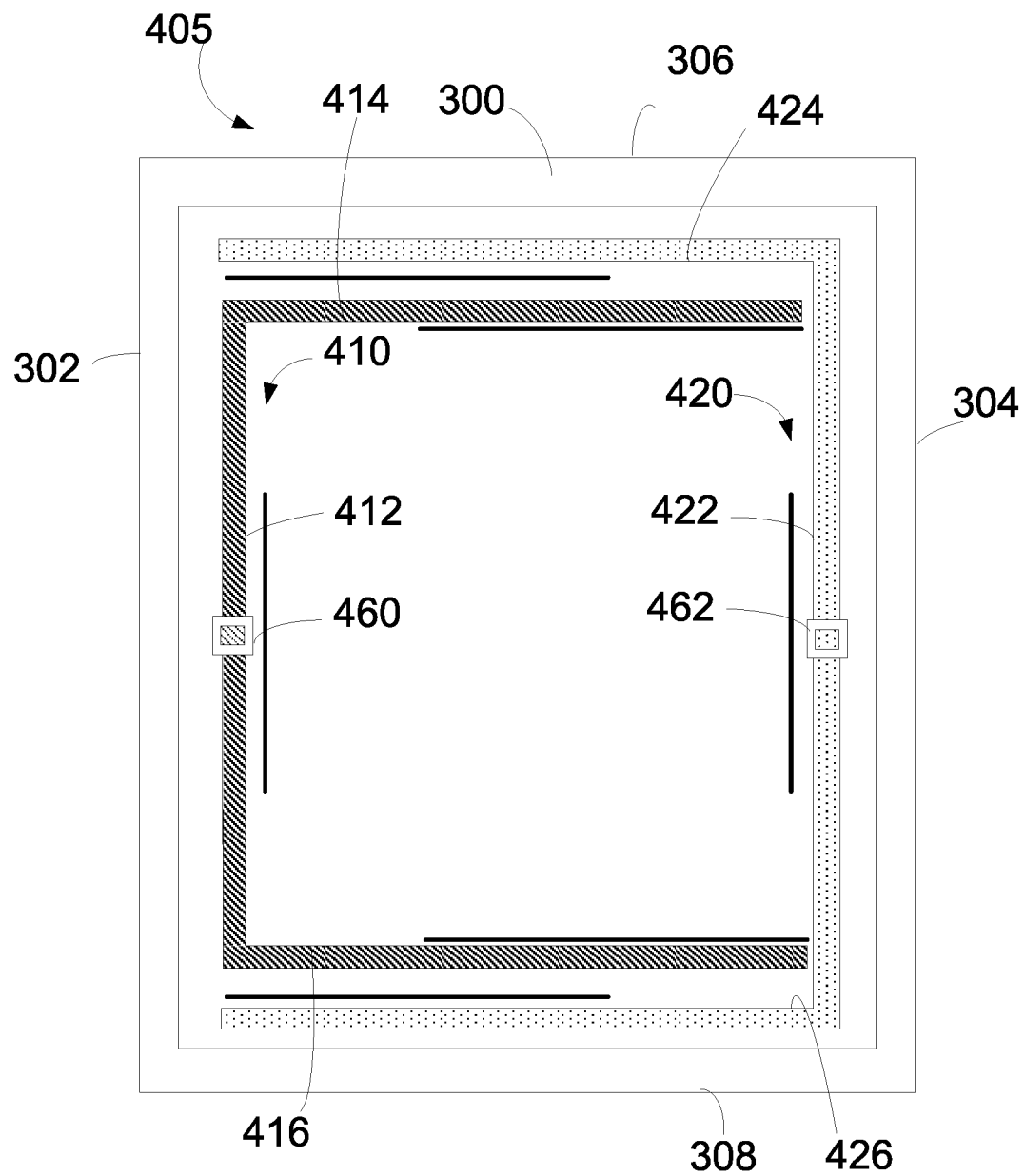
FIGS. 4A-4C each includes an illustration of a top view of the substrate, a stack of layers of an electrochromic device, and bus bars, according to another embodiment.
Figure 4B:
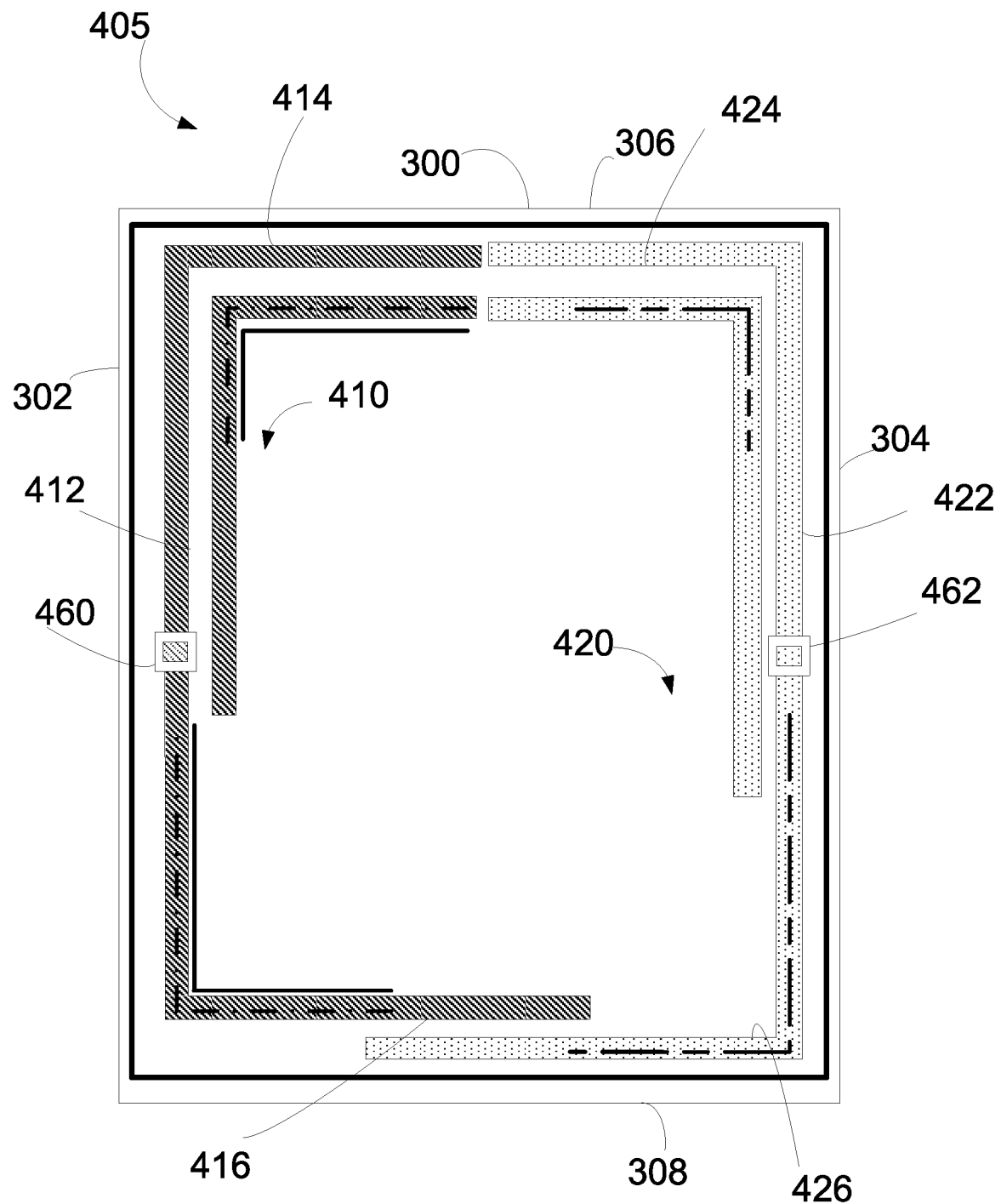
Figure 4C:
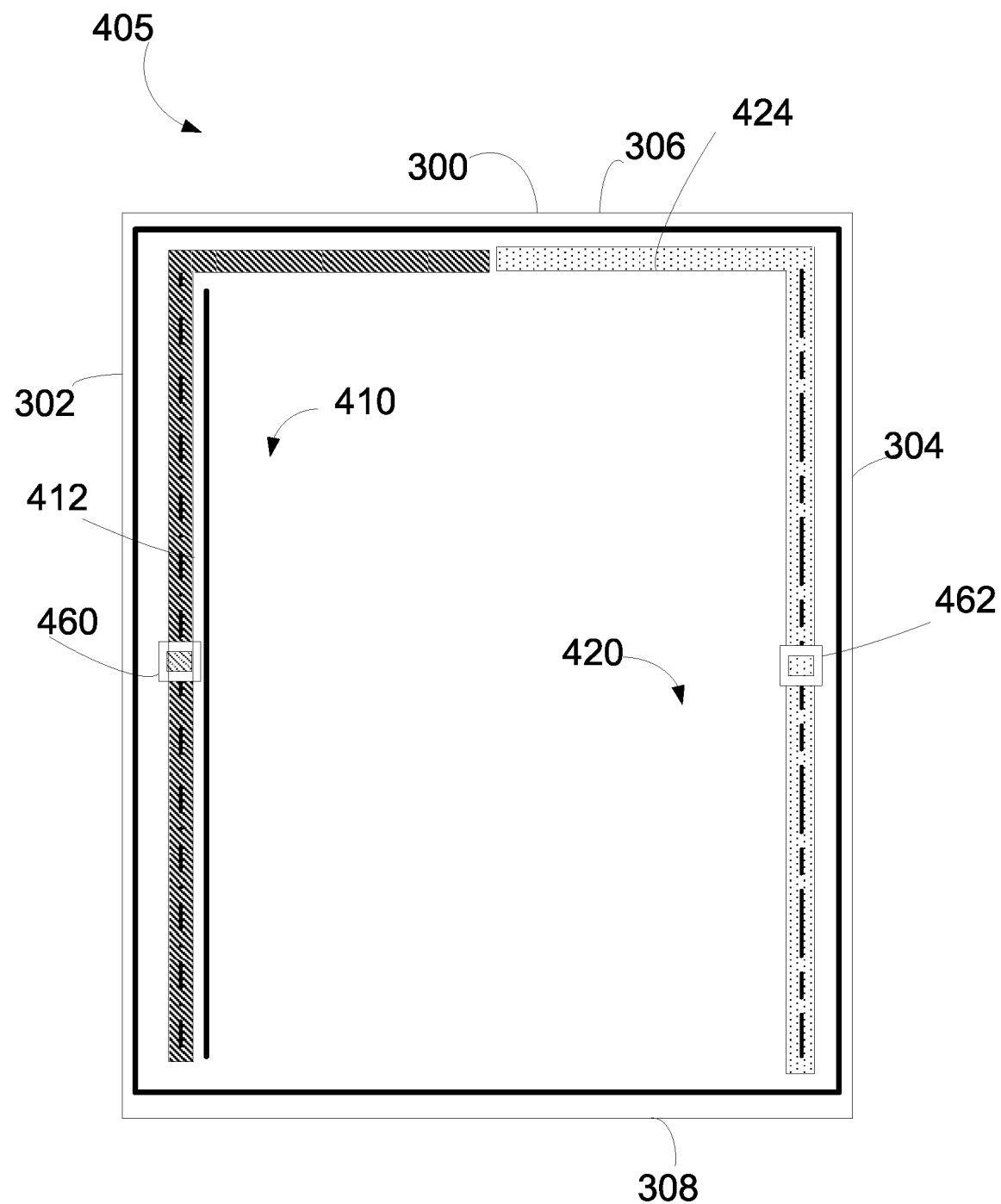

FIGS. 4A-4C each includes an illustration of a top view of a substrate, a stack of layers of an electrochromic device, and bus bars, according to another embodiment. The electrochromic device 405 of FIG. 4 is substantially similar to the electrochromic device 305 of FIG. 3. In fact, the electrochromic device 305 of FIG. 3 is a variant of the first embodiment of FIG. 3, in which equivalent elements have been given identical reference numbers. As such, only additional features or differences from FIG. 3 are described below.

As seen in FIG. 4A, a first bus bar 410 with a first segment 412, a second segment 414, and a third segment 416, a second bus bar 420 with a first segment 422, a second segment 424, and a third segment 426, a first voltage supply terminal 460 connected to the first bus bar 410, and a second voltage supply terminal 463 connected to the second bus bar 420. In one embodiment, the first segment 412 of the first bus bar 410 can extend along the first side 302 of the substrate 300 and the first segment 422 of the second bus bar 422 can extend along the second side 304 of the substrate 300. In one embodiment, the second segment 414 of the of the first bus bar 410 can extend along the third side 306 of the substrate 300 and the second segment 424 of the second bus bar 422 can extend along the third side 306 of the substrate 300. In one embodiment, the second segment 412 of the first bus bar 410 is closer to the fourth side 308 than the second segment 424 of the second bus bar 420. In one embodiment, the third segment 416 of the of the first bus bar 410 can extend along the fourth side 308 of the substrate 300 and the second segment 426 of the second bus bar 422 can extend along the fourth side 308 of the substrate 300. In one embodiment, the third segment 416 of the first bus bar 410 is closer to the third side 306 than the third segment 426 of the second bus bar 420. In one embodiment, the first segment 412, the second segment 414, and the third segment 416 of the first bus bar 410 can be continuous. In one embodiment, the first segment 422, the second segment 424, and the third segment 426 of the second bus bar 420 can be continuous. While three segments are shown, few segments can be used as seen in FIG. 4C.

In another embodiment, as seen in FIG. 4B, the bus bar can include more than three segments. As seen, the segments can be discontinuous, continuous, or a combination of both. In one embodiment, the segments can be spaced apart. As described in more detail below and seen in FIGS. 4B and 4C, the segments, can be electrically activated with a P3 cut. In one embodiment, any one segment of the bus bar can be greater than 65% of the length of the substrate. As seen in FIG. 4C, the first bus bar 410 and the second bus bar 420, each have a segment that is 65% of the length of the substrate 302 and 304 respectively. In one embodiment, a segment of the bus bar can be less than 10% of the length of the substrate. In one embodiment, the longest segment of the first bus bar 410 is parallel to the longest segment of the second bus bar 420, as seen in FIG. 4C. In another embodiment, the longest segment of the first bus bar 410 is orthogonal to the longest segment of the second bus bar 420. In one embodiment, the first bus bar 410 can be an L-shaped bus bar and the second bus bar 420 can be an L-shaped bus bar where the short arm of the L-shape of the first bus bar 410 is adjacent the same side of the substrate 300 as the short arm of the L-shape of the second bus bar 420. In another embodiment, as seen in FIG. 4B, the first bus bar 410 can overlap the second bus bar 420. In one embodiment, the first bus bar 410 can overlap the second bus bar 420 more than once. In another embodiment, the first bus bar 410 can overlap itself, as seen in FIG. 4B. In another embodiment, the second bus bar 420 can overlap itself. In another embodiment, the first bus bar 410 can overlap itself and the second bus bar 420 at different locations along the substrate, as in along different sides of the substrate. In another embodiment, the first bus bar 410 can overlap itself and the second bus bar 420 along the same side of the substrate.

In one embodiment, the first segment 412 of the first bus bar 410 can have a length that extends the majority of a length of the first side 302 of the substrate 300, the second segment 414 of the first bus bar 410 can have a length that extends the majority of a length of the third side 306 of the substrate 300, and the third segment 416 can have a length that extends the majority of a length of the fourth side 308 of the substrate 300. In one embodiment, the first segment 422 of the second bus bar 420 can have a length that extends the majority of a length of the second side 304 of the substrate 300, the second segment 424 of the second bus bar 420 can have a length that extends the majority of a length of the third side 306 of the substrate 300, and the third segment 426 can have a length that extends the majority of a length of the fourth side 308 of the substrate 300. In another embodiment, the first segment 412 of the first bus bar 410 can have a length that is at least 55% a length of the first side 302 of the substrate 300. In another embodiment, the first segment 422 of the second bus bar 420 can have a length that is at least 55% a length of the second side 304 of the substrate 300. In another embodiment, the second segment 414 of the first bus bar 410 can have a length that is at least 55% a length of the third side 306 of the substrate 300 and the second segment 424 of the second bus bar 420 can have a length that is at least 55% a length of the third side 306 of the substrate 300. In another embodiment, the third segment 416 of the first bus bar 410 can have a length that is at least 55% a length of the fourth side 308 of the substrate 300 and the third segment 426 of the second bus bar 420 can have a length that is at least 55% a length of the fourth side 308 of the substrate 300. In one embodiment, the second voltage supply terminal can be along between 5% and 95% the length of the first segment 322 of the second bus bar 320.

The first voltage supply terminal 460 can be connected to the first bus bar 410. In one embodiment, the first voltage supply terminal 460 can be along the length of the first segment 412 of the first bus bar 410. In another embodiment, first voltage supply terminal 460 can be about a center of the first segment 412 of the first bus bar 410. In another embodiment, first voltage supply terminal 460 can be offset from a center of the first segment 412 of the first bus bar 410. In one embodiment, the first voltage supply terminal 460 can be along between 5% and 95% the length of the first segment 412 of the first bus bar 410. The second voltage supply terminal 462 can be connected to the second bus bar 420. In one embodiment, the second voltage supply terminal 462 can be along the length of the first segment 422 of the second bus bar 420. In one embodiment, the second voltage supply terminal 462 can be along the first segment 422. In another embodiment, second voltage supply terminal 462 can be offset from a center of the first segment 422 of the second bus bar 420. In one embodiment, the second voltage supply terminal can be along between 5% and 95% the length of the first segment 422 of the second bus bar 420.

As a voltage potential between bus bars 410 and 420 can cause current to flow through the top transparent conductive layer and the bottom transparent conductive layer to alter the tint profile to a continuously graded transmission. Additionally, since the voltage supply terminals are offset along the major lengths of each bus bar, the resistance is varies along the length of each bus bar thereby providing for current to flow through the top transparent conductive layer and the bottom transparent conductive layer to alter the tint profile to a continuously graded transmission.

Figure 5:
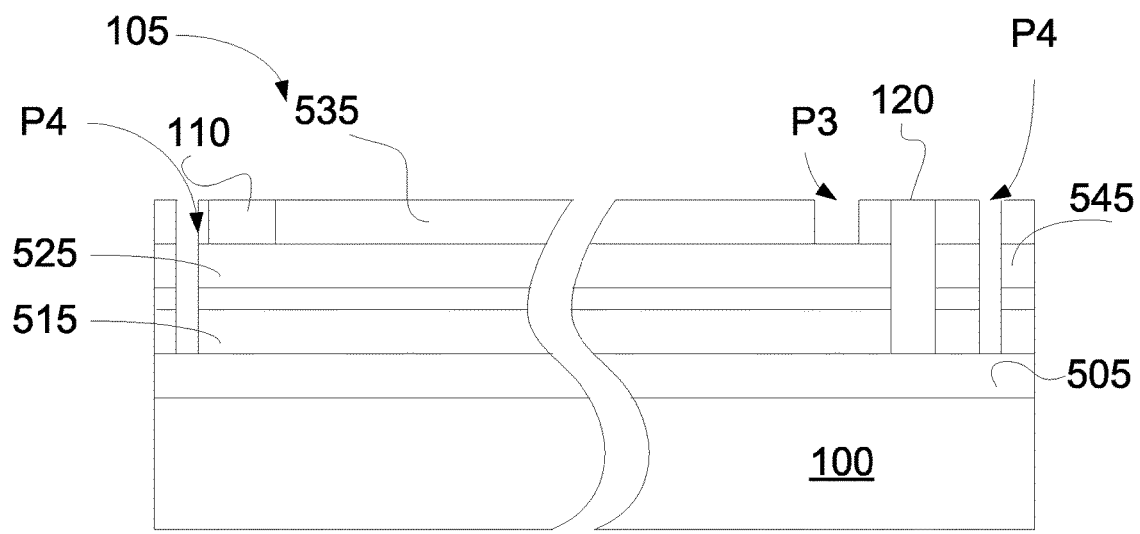
FIG. 5 includes a representative cross-sectional view along a portion of a substrate of FIG. 4, with a stack of layers for an electrochromic device (ECD) and bus bars, according to one embodiment.

FIG. 5 includes an illustration of a cross-sectional view of a portion of a substrate 100, a stack of layers 505, 515, 525, and 535 for an electrochemical device 105, and bus bars, according to one embodiment. In one embodiment, the electrochemical device 105 is an electrochromic device. The electrochemical device 105 can include a first transparent conductive layer 505, a cathodic electrochemical layer 515, an anodic electrochemical layer 525, and a second transparent conductive layer 535. In one embodiment, the electrochromic device 105 can also include an ion conducting layer 545 between the cathodic electrochemical layer 515 and the anodic electrochemical layer 525. In one embodiment, the first transparent conductive layer 505 can be between the substrate 100 and the cathodic electrochemical layer 515. The cathodic electrochemical layer 515 can be between the first transparent conductive layer 505 and the anodic electrochemical layer 525. In one embodiment, the anodic electrochemical layer 525 can be between the cathodic electrochemical layer 515 and the second transparent conductive layer 535.

The substrate 100 can include a glass substrate, a sapphire substrate, an aluminum oxynitride substrate, a spinel substrate, or a transparent polymer. In a particular embodiment, the substrate 100 can be float glass or a borosilicate glass and have a thickness in a range of 0.025 mm to 4 mm thick. In another particular embodiment, the substrate 100 can include ultra-thin glass that is a mineral glass having a thickness in a range of 10 microns to 300 microns. The first transparent conductive layers 505 and second transparent conductive layer 535 can include a conductive metal oxide or a conductive polymer. Examples can include a indium oxide, tin oxide or a zinc oxide, either of which can doped with a trivalent element, such as Sn, Sb, Al, Ga, In, or the like, or a sulfonated polymer, such as polyaniline, polypyrrole, poly(3,4-ethylenedioxythiophene), or the like or one or several metal layer(s) or a metal mesh or a nanowire mesh or graphen or carbon nanotubes or a combination thereof. The transparent conductive layers 505 and 535 can have the same or different compositions.

The cathodic electrochemical layer 515 and the anodic electrochemical layer 525 can be electrode layers. In one embodiment, the cathodic electrochemical layer 515 can be an electrochromic layer. In another embodiment, the anodic electrochemical layer 525 can be a counter electrode layer. The electrochromic layer can include an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, or any combination thereof and have a thickness in a range of 20 nm to 2000 nm. The counter electrode layer 525 can include any of the materials listed with respect to the electrochromic layer and may further include nickel oxide (NiO, $Ni_2O_3$, or combination of the two) or iridium oxide, and Li, Na, H, or another ion and have a thickness in a range of 20 nm to 1000 nm. The ion conductive layer 545 (sometimes called an electrolyte layer) can be optional, and can have a thickness in a range of 1 nm to 1000 nm in case of an inorganic ion conductor or 5 micron to 1000 microns in case of an organic ion conductor. The ion conductive layer 545 can include a silicate with or without lithium, aluminum, zirconium, phosphorus, boron; a borate with or without lithium; a tantalum oxide with or without lithium; a lanthanide-based material with or without lithium; another lithium-based ceramic material particularly LixMOyNz where M is one or a combination of transition metals or the like.

In one embodiment, the first bus bar 110 is connected to the first transparent conductive layer 505 and the second bus bar 120 is electrically connected to the second transparent conductive layer 535. In one embodiment, the first transparent conductive layer 535 includes portions removed, so that the first bus bar 110 and the second bus bar 120 are not electrically connected. In one embodiment, the first bus bar 110 is a non-penetrating bus bar, such that the bus bar is self-isolating, removing the requirement for additional isolation cuts. In one embodiment, a P4 cut can circumscribe the device. In another embodiment, a P3 cut can electrically isolate the second bus bar 120. In one embodiment, the isolation cuts can activate the bus bars. In one embodiment, the length of the isolation cut is the area and length of the active bus bar. Such removed portions are typically 20 nm to 2000 nm wide.

Figure 6:
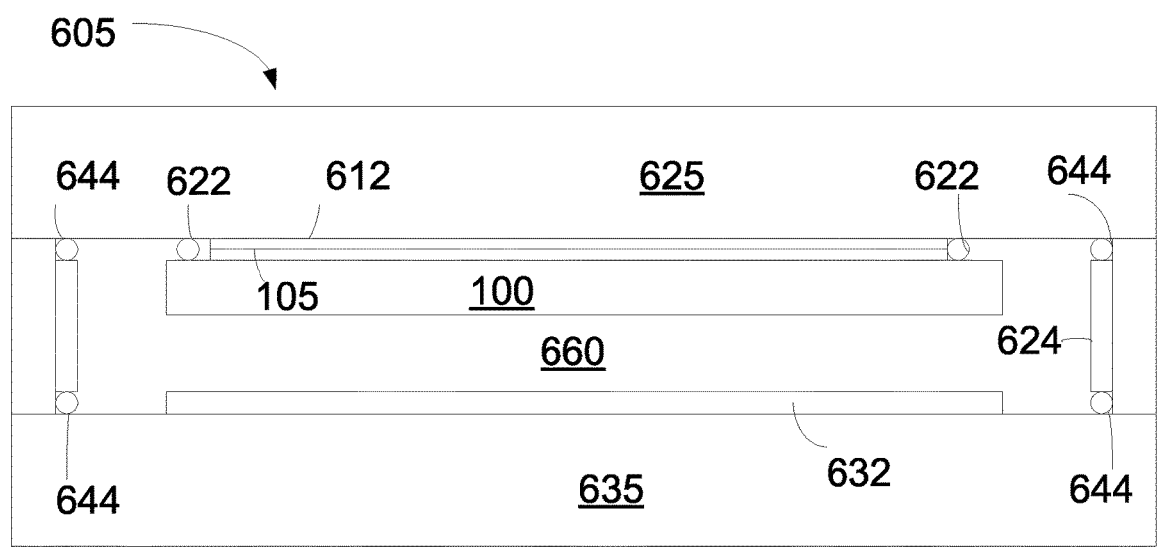
FIG. 6 includes a schematic of an IGU, according to one embodiment.

FIG. 6 includes an illustration of a cross-sectional of an insulated glass unit (IGU) 605 that includes the substrate 100 and the electrochromic device 105, 205, 305, 404 as illustrated in FIGS. 1-5. The IGU 605 further includes a counter substrate 625 and a solar control film 612 disposed between the electrochromic device and the counter substrate 625. A seal 622 is disposed between the substrate 100 and the counter substrate 625 and around the electrochromic device 105. The seal 622 can include a polymer, such as polyisobutylene. The counter substrate 625 is coupled to a pane 635. Each of the counter substrate 625 and pane 635 can be a toughened or a tempered glass and have a thickness in a range of 2 mm to 9 mm. A low-emissivity layer 632 can be disposed along an inner surface of the pane 635. The counter substrate 625 and pane 635 can be spaced apart by a spacer bar 642 that surrounds the substrate 100 and electrochromic device 105. The spacer bar 642 is coupled to the counter substrate 625 and pane 635 via seals 644. The seals 644 can be a polymer, such as polyisobutylene. The seals 644 can have the same or different composition as compared to the seal 622. An adhesive joint is designed to hold the counter substrate 625 and the pane 635 together and is provided along the entire circumference of the edges of the counter substrate 625 and the pane 635. An internal space 660 of the IGU 605 may include a relatively inert gas, such as a noble gas or dry air. In another embodiment, the internal space 660 may be evacuated. The IGU can include an energy source, a control device, and an input/output (I/O) unit. The energy source can provide energy to the electrochromic device 105 via the control device. In an embodiment, the energy source may include a photovoltaic cell, a battery, another suitable energy source, or any combination thereof. The control device can be coupled to the electrochromic device and the energy source. The control device can include logic to control the operation of the electrochromic device. The logic for the control device can be in the form of hardware, software, or firmware. In an embodiment, the logic may be stored in a field programmable gate array (FPGA), an application-specific integrated circuit (ASIC), or another persistent memory. In an embodiment, the control device may include a processor that can execute instructions stored in memory within the control device or received from an external source. The I/O unit can be coupled to the control device. The I/O unit can provide information from sensors, such as light, motion, temperature, another suitable parameter, or any combination thereof. The I/O unit may provide information regarding the electrochromic device 105, the energy source, or control device to another portion of the apparatus or to another destination outside the apparatus.

Embodiments as illustrated and described above can allow a continuously graded electrochromic device to be maintained for nearly any period of time after switching transmission states is completed. Further designs can be useful to reduce power consumption, provide more flexibility, simplify connections, or combinations thereof. An electrochromic device can have a portion that is in a continuously graded transmission state and another portion with a substantially uniform transmission state. The precise point where transition between the continuously graded transmission state and the substantially uniform transmission state may be difficult to see. For example, the portion with the continuously graded transmission state can be fully bleached at one end and fully tinted at the other. The other portion may be fully bleached and be located beside the fully bleached end of the continuously graded portion, or the other portion may be fully tinted and be located beside the fully tint end of the continuously graded portion. Embodiments with discrete grading between portions may be used without deviating from the concepts described herein. For example, an electrochromic device can have a portion near the top of a window that is fully bleached, and a remainder that is continuously graded from fully tinted transmission state closer to the top of the window to a fully bleached transmission state near the bottom of the window. Such an embodiment may be useful to allow more light to enter to allow better color balance within the room while reducing glare. In still another embodiment, an electrochromic device can be maintained in a continuously graded state without any portion maintained in a substantially uniform transmission state. Clearly, many different transmission patterns for an electrochromic device are possible.

Many different aspects and embodiments are possible. Some of those aspects and embodiments are described below. Exemplary embodiments may be in accordance with any one or more of the ones as listed below.

Various Embodiments

Embodiment 1. An electrochromic device may include a first bus bar electrically connected to a first transparent conductor, where the first bus bar comprises a first segment between a second segment and a third segment, where the first segment has a first thickness that is less than a second thickness of the second segment and less than a third thickness of the third segment.

Embodiment 2. The electrochromic device of embodiment 1, further comprising a second bus bar electrically connected to a second transparent conductor, where the second bus bar comprises a fourth segment between a fifth segment and a sixth segment.

Embodiment 3. The electrochromic device of embodiment 2, where the fourth segment has a fourth thickness that is less than a fifth thickness of the fifth segment and a sixth thickness of the sixth segment.

Embodiment 4. The electrochromic device of embodiment 1, where the first segment of the first bus bar is a first shape and the second segment of the first bus bar is a second shape, and where the first shape is different from the second shape.

Embodiment 5. The electrochromic device of embodiment 1, further comprises a substrate with a first side, a second side, a third side, and a fourth side, where the first side is opposite to the second side, where the third side is orthogonal to the first side, and where the fourth side is opposite the third side.

Embodiment 6. The electrochromic device of embodiment 5, where the first bus bar is along the first side of the substrate, and the second bus bar is along the second side of the substrate.

Embodiment 7. The electrochromic device of embodiment 1, further can include a first voltage supply terminal electrically connected to the first bus bar.

Embodiment 8. The electrochromic device of embodiment 7, where the first voltage supply terminal is connected to the first segment of the first bus bar.

Embodiment 9. The electrochromic device of embodiment 8, where the first voltage supply terminal is connected to the first segment of the first bus bar about the center of the first segment.

Embodiment 10. The electrochromic device of embodiment 2, further can include a second voltage supply terminal electrically connected to the second bus bar.

Embodiment 11. The electrochromic device of embodiment 9, where the second voltage supply terminal is connected to the fourth segment of the first bus bar.

Embodiment 12. An electrochromic device can include a substrate can include a first side, a second side, a third side, and a fourth side, where the first side is opposite to the second side, where the third side is orthogonal to the first side, and where the fourth side is opposite the third side; a first bus bar electrically connected to a first transparent conductor, where the first bus bar has a major length along the first side of the substrate and at least one minor length along the third side of the substrate; and a first voltage supply terminal connected to the first bus bar along the major length of the first bus bar, where the voltage supply terminal is offset from a center of the major length of the first bus bar.

Embodiment 13. The electrochromic device of embodiment 12, where the first voltage supply terminal is closer to fourth side of the substrate than the third side of the substrate.

Embodiment 14. The electrochromic device of embodiment 12, where the first voltage supply terminal is connected to the first bus bar along a distance between 55% and 95% the major length of the first bus bar.

Embodiment 15. The electrochromic device of embodiment 12, where the first bus bar comprises a first segment between a second segment and a third segment.

Embodiment 16. The electrochromic device of embodiment 15, where the first segment is along the first side of the substrate, the second segment is along the third side of the substrate, and the third segment is along the fourth side of the substrate.

Embodiment 17. The electrochromic device of embodiment 15, where the first segment is along the first side of the substrate, the second segment is along both the first side and the third side of the substrate, and the third segment is along both the first side and the fourth side of the substrate.

Embodiment 18. The electrochromic device of embodiment 15, where the first segment, the second segment, and the third segment of the first bus bar are continuous.

Embodiment 19. The electrochromic device of embodiment 15, where the first segment, the second segment, and the third segment of the first bus bar are discontinuous.

Embodiment 20. The electrochromic device of embodiment 12, further can include a second bus bar with a fourth segment between a fifth segment and a sixth segment.

Embodiment 21. The electrochromic device of embodiment 20, where the fourth segment, the fifth segment, and the sixth segment of the second bus bar are continuous.

Embodiment 22. The electrochromic device of embodiment 20, where the fourth segment, the fifth segment, and the sixth segment of the second bus bar are continuous.

Embodiment 23. The electrochromic device of embodiment 20, where the fourth segment is along the second side of the substrate, the fifth segment is along the third side of the substrate, and the sixth segment is along the fourth side of the substrate.

Embodiment 24. The electrochromic device of embodiment 20, where the fourth segment is along the second side of the substrate, the fifth segment is along both the second side and the third side of the substrate, and the sixth segment is along both the second side and the fourth side of the substrate.

Embodiment 25. The electrochromic device of embodiment 12, further can include a second voltage supply terminal connected to the second bus bar along a major length of the second bus bar, where the voltage supply terminal is offset from a center of the major length of the second bus bar.

Embodiment 26. The electrochromic device of embodiment 12, where the first segment of the first bus bar is a first shape and the second segment of the first bus bar is a second shape, and where the first shape is different from the second shape.

Embodiment 27. The electrochromic device of embodiment 12, where the substrate comprises glass, sapphire, aluminum oxynitride, spinel, polyacrylic compound, polyalkene, polycarbonate, polyester, polyether, polyethylene, polyimide, polysulfone, polysulfide, polyurethane, polyvinylacetate, another suitable transparent polymer, co-polymer of the foregoing, float glass, borosilicate glass, or any combination thereof.

Embodiment 28. The electrochromic device of embodiment 12, where the major length is more than 65% a length of a side of the substrate.

Embodiment 29. The electrochromic device of embodiment 28, where the minor length is less than 10% the length of the side of the substrate.

Embodiment 30. The electrochromic device of embodiment 12, further can include: an active stack, the active stack can include: a first transparent conductive layer; a second transparent conductive layer; an anodic electrochemical layer between the first transparent conductive layer and the second transparent conductive layer; and a cathodic electrochemical layer between the first transparent conductive layer and the second transparent conductive layer.

Embodiment 31. The electrochromic device of embodiment 30, where the cathodic electrochemical layer comprises $WO_3$, $V_2O_5$, $MoO_3$, $Nb_2O_5$, $TiO_2$, $CuO$, $Ni_2O_3$, $NiO$, $Ir_2O_3$, $Cr_2O_3$, $Co_2O_3$, $Mn_2O_3$, mixed oxides (e.g., W—Mo oxide, W—V oxide), lithium, aluminum, zirconium, phosphorus, nitrogen, fluorine, chlorine, bromine, iodine, astatine, boron, a borate with or without lithium, a tantalum oxide with or without lithium, a lanthanide-based material with or without lithium, another lithium-based ceramic material, or any combination thereof.

Embodiment 32. The electrochromic device of embodiment 30, further can include an ion-conducting layer between the cathodic electrochemical layer and the anodic electrochemical layer.

Embodiment 33. The electrochromic device of embodiment 32, where the ion-conducting layer comprises lithium, sodium, hydrogen, deuterium, potassium, calcium, barium, strontium, magnesium, oxidized lithium, $Li_2WO_4$, tungsten, nickel, lithium carbonate, lithium hydroxide, lithium peroxide, or an alkaline earth metal, transition metal, Zn, Ga, Ge, Al, Cd, In, Sn, Sb, Pb, Bi, B, Si, P, S, As, Se, Te, silicates, silicon oxides, tungsten oxides, tantalum oxides, niobium oxides, borates, aluminum oxides, lithium silicate, lithium aluminum silicate, lithium aluminum borate, lithium aluminum fluoride, lithium borate, lithium nitride, lithium zirconium silicate, lithium niobate, lithium borosilicate, lithium phophosilicate, other lithium-based ceramic materials, lithium salts, and dopants including lithium, sodium, hydrogen, deuterium, potassium, calcium, barium, strontium, magnesium, or combinations thereof.

Embodiment 34. The electrochromic device of embodiment 30, where the second transparent conductive layer comprises indium oxide, indium tin oxide, doped indium oxide, tin oxide, doped tin oxide, zinc oxide, doped zinc oxide, ruthenium oxide, doped ruthenium oxide and any combination thereof.

Embodiment 35. The electrochromic device of embodiment 30, where the anodic electrochemical layer comprises a an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, $Ta_2O_5$, $ZrO_2$, $HfO_2$, $Sb_2O_3$, a lanthanide-based material with or without lithium, another lithium-based ceramic material, a nickel oxide (NiO, $Ni_2O_3$, or combination of the two), and Li, nitrogen, Na, H, or another ion, any halogen, or any combination thereof.

Embodiment 36. The electrochromic device of embodiment 30, where the first transparent conductive layer comprises indium oxide, indium tin oxide, doped indium oxide, tin oxide, doped tin oxide, zinc oxide, doped zinc oxide, ruthenium oxide, doped ruthenium oxide, silver, gold, copper, aluminum, and any combination thereof.

Embodiment 37. An electrochromic device can include: a substrate can include a first side, a second side, a third side, and a fourth side, where the first side is opposite to the second side, where the third side is orthogonal to the first side, and where the fourth side is opposite the third side; a first bus bar electrically connected to a first transparent conductor, where the first bus bar comprises a first segment with a first length, a second segment with a second length, and a third segment with a third length, where the first segment is along the first side of the substrate, the second segment is along the third side of the substrate, and the third segment is along the fourth side of the substrate; and a second bus bar electrically connected to a second transparent conductor, where the second bus bar comprises a fourth segment with a fourth length, a fifth segment with a fifth length, and a sixth segment with a sixth length, where the fourth segment is along the second side of the substrate, the fifth segment is along the third side of the substrate, and the sixth segment is along the fourth side of the substrate, and where the second segment is closer to the fourth side than the fifth segment.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub-combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electrochromic device comprising:
    a first bus bar electrically connected to a first transparent conductor, wherein the first bus bar comprises a first segment between a second segment and a third segment, wherein the first segment has a first thickness that is less than a second thickness of the second segment and less than a third thickness of the third segment.

2. The electrochromic device of claim 1, further comprises a second bus bar electrically connected to a second transparent conductor, wherein the second bus bar comprises a fourth segment between a fifth segment and a sixth segment.

3. The electrochromic device of claim 2, wherein the fourth segment has a fourth thickness that is less than a fifth thickness of the fifth segment and a sixth thickness of the sixth segment.

4. The electrochromic device of claim 2, further comprises a second voltage supply terminal electrically connected to the second bus bar.

5. The electrochromic device of claim 1, wherein the first segment of the first bus bar is a first shape and the second segment of the first bus bar is a second shape, and wherein the first shape is different from the second shape.

6. The electrochromic device of claim 1, further comprises a substrate with a first side, a second side, a third side, and a fourth side, wherein the first side is opposite to the second side, wherein the third side is orthogonal to the first side, and wherein the fourth side is opposite the third side.

7. The electrochromic device of claim 6, wherein the first bus bar is along the first side of the substrate, and the second bus bar is along the second side of the substrate.

8. The electrochromic device of claim 1, further comprises a first voltage supply terminal electrically connected to the first bus bar.

9. The electrochromic device of claim 8, wherein the first voltage supply terminal is connected to the first segment of the first bus bar.

10. The electrochromic device of claim 9, wherein the first voltage supply terminal is connected to the first segment of the first bus bar about the center of the first segment.

11. The electrochromic device of claim 10, wherein the second voltage supply terminal is connected to the fourth segment of the first bus bar.

12. An electrochromic device comprising:
a substrate comprises a first side, a second side, a third side, and a fourth side, wherein the first side is opposite to the second side, wherein the third side is orthogonal to the first side, and wherein the fourth side is opposite the third side;
a first bus bar electrically connected to a first transparent conductor, wherein the first bus bar comprises a first segment with a first length, a second segment with a second length, and a third segment with a third length, wherein the first segment is along the first side of the substrate, the second segment is along the third side of the substrate, and the third segment is along the fourth side of the substrate; and
a second bus bar electrically connected to a second transparent conductor, wherein the second bus bar comprises a fourth segment with a fourth length, a fifth segment with a fifth length, and a sixth segment with a sixth length, wherein the fourth segment is along the second side of the substrate, the fifth segment is along the third side of the substrate, and the sixth segment is along the fourth side of the substrate, and wherein the second segment is closer to the fourth side than the fifth segment, wherein the second segment overlaps the fifth segment.

* * * * *